May 29, 1934.  L. D. LOVEKIN  1,960,271
TEMPERATURE AND PRESSURE RELIEF VALVE
Filed May 24, 1928
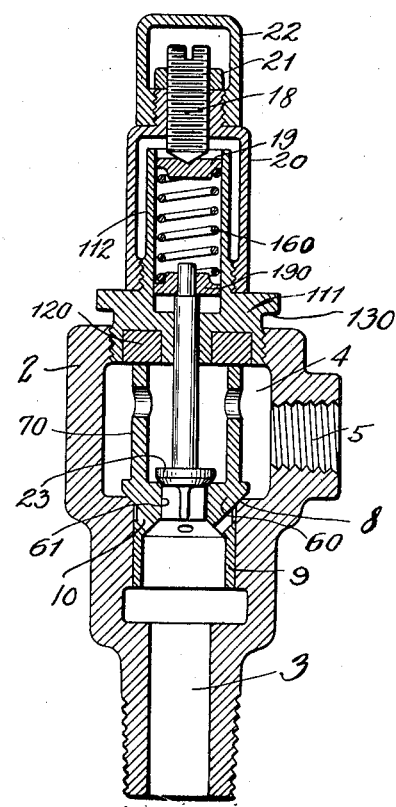
INVENTOR.
LUTHER D. LOVEKIN
BY John E. Hubbell
ATTORNEY Patented May 29, 1934

1,960,271

UNITED STATES PATENT OFFICE 1,960,271

TEMPERATURE AND PRESSURE RELIEF VALVE

Luther D. Lovekin, Wynnewood, Pa., assignor to Kitson Company, Philadelphia, Pa., a corporation of West Virginia Application May 24, 1928, Serial No. 280,193

3 Claims. (Cl. 277—44)

The general object of my present invention is to provide an improved relief valve, and, more particularly, an improved relief valve specially adapted for use in connection with a domestic water heater tank or boiler.

A more specific object of the invention is to provide a relief valve of the character referred to, in which novel temperature responsive means effective to prevent the temperature of the water in the tank or boiler with which the valve is used, from exceeding a predetermined value, are combined in a novel and effective manner with pressure responsive means effective to prevent the attainment of an objectionably high water pressure in the tank or boiler with which the valve is associated.

Heretofore it has also been the practice to attempt to protect hot water tanks or boilers of the kind specified against injurious consequence of unduly high water temperatures by the use of pressure controlled relief valves normally biased to a closed position by means of a spring or weight. It has been found, however, that a pressure relief valve, the operation of which depends upon the action of a spring or weight, cannot possibly serve to relieve the pressure of the liquid heated whenever necessary to prevent dangerously high temperatures, since in practice such temperatures may occasionally be obtained with a water pressure in the tank or boiler lower than that required to operate the pressure relief valve since the latter must be adjusted to remain closed under normal tank or boiler water pressures higher than those which may exist when the tank or boiler water temperature becomes dangerously high. This difficulty is avoided, in accordance with the present invention, by the use of a main relief valve comprising temperature responsive devices which are independent in their operation of the actual water pressure in the tank or boiler, combined with a supplemental valve normally held in its closed position by a yielding force.

In the preferred embodiment of the invention hereinafter described in detail, the valve comprises a casing and valve parts so relatively massive and so disposed as to insure a relatively rapid conduction of heat from the water to the fusible disc, whereby the temperature of the latter at all times approximates that of the heated water in the tank or boiler, and to provide an arrangement in which the fusible disc is so disposed that it may yield, and thereby perform its relief functions under ordinary conditions requiring the performance of such functions, without the total destruction of the fusible disc or its impairment for further use when the valve is thereafter readjusted to compensate for the thinning of the disc resulting from such operation. The resultant capacity of a single disc for repeated operations before disc replacement becomes necessary is a novel and advantageous characteristic of my invention.

By thus combining temperature responsive means and pressure responsive means, I render my improved relief valve effective to protect the tank or boiler with which it is associated against excessive pressures due to such causes as water hammer, or the thermal expansion of the liquid in the tank or boiler when the latter is heated up with its water inlet and outlet connections closed, or when the tank or boiler forms a part of a closed system not containing air pockets or analogous provisions for accommodating the thermal expansion of the water. In such case, the heating of the water from normal atmospheric temperature to a temperature appreciably below 212° F. may subject the tank or boiler to an internal pressure much in excess of the normal water pressure which the tank or boiler is intended to withstand.

The various features of novelty which characterize my invention are pointed out with particularity in the claims annexed to and forming a part of this specification. For a better understanding of the invention, however, and the advantages possessed by it, reference should be had to the accompanying drawing and descriptive matter in which I have illustrated and described a preferred embodiment of the invention.

The one figure of the drawing is a transverse section of a form of valve involving both temperature and pressure responsive means.

The valve shown is intended to be mounted in the shell of a boiler or hot water tank which may form part of a domestic water system with which my improved valve may be used. The casing 2 of the valve is provided with an inlet opening or passage way 3 adapted to communicate with the interior of such a shell or tank and which opens into a central valve chamber 4, the said valve chamber discharging to the atmoshere or to waste through an outlet 5. The flow of fluid through the passageway 3 is controlled by a main temperature responsive valve member 60 having a stem 70 and engaging a seat 8 formed at the inner end of the passageway 3 and by a supplemental valve 23 controlling flow through a central port 61 in the valve member 60. The valve 60 is provided with a tubular skirt portion 9 having openings 10 formed therein, which skirt slidably fits the interior of the passageway 3 to guide the valve in its movements to and from the said seat in known manner.

The valve 60 is normally retained in closed position by means of a part 111 screwed into a threaded opening formed in the valve body 2 and in axial alinement with the passageway 3. The part 111 is recessed at its inner side to receive a body of fusible metal 120 having the desired melting point. Normally the part 111 is threaded into the valve casing far enough so that the fusible part 120 is brought into engagement with the outer end of the stem 70 of the valve 60, and the latter is pressed against its seat 8 thereby preventing the escape of fluid through the passageway 3.

The outer end of the part 111 is provided with an annular flange or stop 130, the purpose of which is to prevent the part 111 from being moved inwardly of the valve body to such an extent as to hold the valve in closed position when the fusible disc is not in place. Heat is conducted to the fusible part 120 from the water within the hot water heater tank or boiler with which the valve is used through the valve body and part 111, and through the movable valve member, all of which are preferably made sufficiently massive and consequently of sufficient heat conductivity to normally maintain the part 120 at a temperature approximating that of the water in the tank or boiler 1.

The valve 23 is subjected to the action of a spring 160 which tends to hold the valve in its closed position, the tank or boiler pressure acting on the underside of the valve 23 and tending to lift the latter off its seat. The stem 70 of the valve 60 is in the form of a cylindrical shell perforated to permit the escape to the valve outlet passage, of fluid passing through the port 61 when the valve 23 opens. The outer end of the shell 70 engages the fusible metal part 120. The part 120 is in the form of an annulus and is received in an annular pocket formed in the plug member 111 and surrounding the opening formed in the latter for the stem of the valve 23. The plug 111 comprises a tubular extension 112 providing a chamber for the spring 160, spring followers 19, and 190, the latter being detachably connected to the stem of the valve 23 and interposed between the latter and the spring 160. The valve shown comprises a bonnet 20 threaded onto the tubular extension 112 of the member 111.

Advantageously, means are provided for adjusting the tension of the spring 16, and in the construction shown, this result is secured by the use of an abutment screw 18 against which the outer end of the spring 16 acts through a follower or bearing member 19. The screw 18 is held in a threaded opening formed in the outer end of the bonnet 20 threaded onto the member 111. A lock nut 21 forms a convenient means for securing the abutment screw 18 in any desired adjustment, and advantageously, as shown, the outer end of the screw 18 and the nut 21 are normally enclosed by a cap 22 threaded onto the bonnet member 20.

With the valve mechanism shown, the tension of the spring 160 must be great enough to hold the auxiliary valve 23 against its seat unless and until the water pressure in the tank or boiler with which the valve is associated rises to the value at which the valve 23 is intended to open. The tension of the spring 160 must be small enough, however, so that with the lower pressure normally prevailing in the tank or boiler, that pressure will be effective, acting against the combined areas of the valve 23 and the valve 60, to raise the latter when the water temperature in the tank or boiler becomes high enough to cause the annular body of fusible metal 120 to soften and yield. The value shown has a capacity for repeated use of the fusible metal part 120 with adjustments of the plug 111 to compensate for the thinning of the fusible metal, which is now described.

When the temperature attained in the heater or boiler is not sufficient to completely fuse the metal of the disc, but only sufficient to permit the valve to open slightly, a small quantity of the fusible metal is squeezed out of the recess in the plug 111. The effect of this on the disc 120 is to thin the latter. Usually the metal thus squeezed out of said recess is ultimately washed away by the escaping water, and in any event it does not prevent the valve member 60 after so operating, from being restored to its normally closed position by screwing the plug 111 inwardly to reseat the valve. Thus the valve may operate in response to temperature a number of times before it becomes necessary to replace the fusible disc 120. The fact that the disc 120 does not have to be replaced after each temperature response results in a material saving in the servicing of the relief valve. The provision of the shoulder 130 on plug 111 makes it impossible to hold the valve in closed position unless the disc 120 is in place and thus tends to make the device foolproof. Were this shoulder or stop not provided it would be possible to seat the valve and prevent the relief of pressure in an emergency, which might result in damage to the heating system. Alternative constructions for use in lieu of the construction illustrated and described herein are disclosed and claimed in my co-pending application, Serial No. 307,871, filed September 24, 1928 and forming a continuation in part of the present application.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:—

1. A temperature and pressure controlled relief valve adapted to be connected to a hot water tank and comprising a valve body with inlet and outlet passages, a port connecting said passages and formed with a seat at its outlet side, a valve member, means normally effective to hold said valve member against its seat including a clamping member, and a fusible element interposed between said members, said valve member being formed with a port extending through it and with a valve seat at the outlet side of said port, a supplemental valve member, and spring means normally holding the latter against the last mentioned seat.

2. A temperature and pressure controlled relief valve adapted to be connected to a hot water tank and comprising a valve body formed with communicating inlet and outlet passages and a valve seat at the outlet side of said inlet passage, a main valve member arranged to seat on said valve seat and having a central port and a perforated tubular extension at the outlet side thereof, a supplemental valve member at the outlet side of and normally closing said port, means normally holding said main valve member in its seated position and comprising a plug member mounted in said valve body and formed with an annular recess and a fusible element positioned in said recess and in contact with said tubular extension, a supplemental valve stem extending through said plug member, and spring means engaging the upper end of said supplemental valve stem and normally holding said supplemental valve in its closed position.

3. A temperature and pressure controlled relief valve adapted to be connected to a hot water tank and comprising a valve body formed with communicating inlet and outlet passages and a valve seat at the outlet side of said inlet passage, a main valve member arranged to seat on said valve seat and having a central port and a perforated tubular extension at the outlet side thereof, a supplemental valve member at the outlet side of and normally closing said port, means normally holding said main valve member in its seated position and comprising a plug member adjustably mounted in said valve body and formed with an annular recess and a fusible element positioned in said recess and in contact with said tubular extension, means limiting the adjustment of said plug member, a supplemental valve stem extending through said plug member, and spring means engaging the upper end of said supplemental valve stem and normally holding said supplemental valve in its closed position.

LUTHER D. LOVEKIN.